US010039115B2

(12) United States Patent
Cariou et al.

(10) Patent No.: US 10,039,115 B2
(45) Date of Patent: Jul. 31, 2018

(54) SETTING PARAMETERS FOR SPATIAL REUSE PROPORTIONAL RULE IN NON-PERFECT MANAGED ENVIRONMENTS

(71) Applicant: Intel IP Corporation, Santa Clara, CA (US)

(72) Inventors: Laurent Cariou, Portland, OR (US); Po-Kai Huang, West Lafayette, IN (US)

(73) Assignee: Intel IP Corporation, Santa Clara, CA (US)

( * ) Notice: Subject to any disclaimer, the term of this patent is extended or adjusted under 35 U.S.C. 154(b) by 37 days.

(21) Appl. No.: 15/386,925

(22) Filed: Dec. 21, 2016

(65) Prior Publication Data
US 2017/0331697 A1 Nov. 16, 2017

Related U.S. Application Data

(60) Provisional application No. 62/333,975, filed on May 10, 2016.

(51) Int. Cl.
H04L 12/28 (2006.01)
H04W 72/08 (2009.01)
H04W 84/12 (2009.01)
H04W 88/08 (2009.01)

(52) U.S. Cl.
CPC ............ H04W 72/08 (2013.01); H04W 84/12 (2013.01); H04W 88/08 (2013.01)

(58) Field of Classification Search
None
See application file for complete search history.

(56) References Cited

U.S. PATENT DOCUMENTS

| | | | | |
|---|---|---|---|---|
| 2017/0070962 A1* | 3/2017 | Wang et al. | ........ | H04W 52/241 |
| 2017/0105217 A1* | 4/2017 | Kwon | ................. | H04B 17/318 |
| 2017/0142659 A1* | 5/2017 | Noh | .................. | H04W 52/0245 |
| 2017/0325254 A1* | 11/2017 | Zhou | ................ | H04W 72/1252 |
| 2017/0367129 A1* | 12/2017 | Yang | ...................... | H04L 69/22 |

* cited by examiner

Primary Examiner — Otis L Thompson, Jr.
(74) Attorney, Agent, or Firm — Schwegman Lundberg & Woessner, P.A.

(57) ABSTRACT

Embodiments for an access point (AP) and method for communication in a basic service set (BSS) of a management domain are generally described herein. The AP may be configured to maintain a list of BSSs that belong to the management domain and retrieve, for a station (STA) configured to perform spatial reuse over overlapping basic service set (OBSS) physical layer convergence protocol (PLCP) protocol data units (OBSS PPDUs) belonging to OBSSs from the management domain, at least one parameter for a spatial reuse rule that proportions overlapping basic service set packet detection levels (OBSS_PD) and transmit power (TxPower) levels for the STA. In an embodiment, the AP may retrieve, for a STA configured to perform spatial reuse over OBSS PPDUs not belonging to OBSSs from the management domain, default parameters for a spatial reuse rule that proportions OBSS_PD and TxPower levels for the STA and encode, for transmission to the STA belonging to the OBSSs from the management domain, an indication of the at least one parameters, and encode, for transmission to the STA not belonging to OBSSs from the management domain, an indication of the default parameters.

23 Claims, 7 Drawing Sheets

SETTING PARAMETERS FOR SPATIAL REUSE PROPORTIONAL RULE IN NON-PERFECT MANAGED ENVIRONMENTS

PRIORITY CLAIM

This application claims priority under 35 USC 119(e) to U.S. Provisional Patent Application Ser. No. 62/333,975, filed May 10, 2016, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for setting parameters for spatial reuse proportional rule in non-perfect managed environments.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols. Spatial reuse can increase efficiency of a WLAN.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
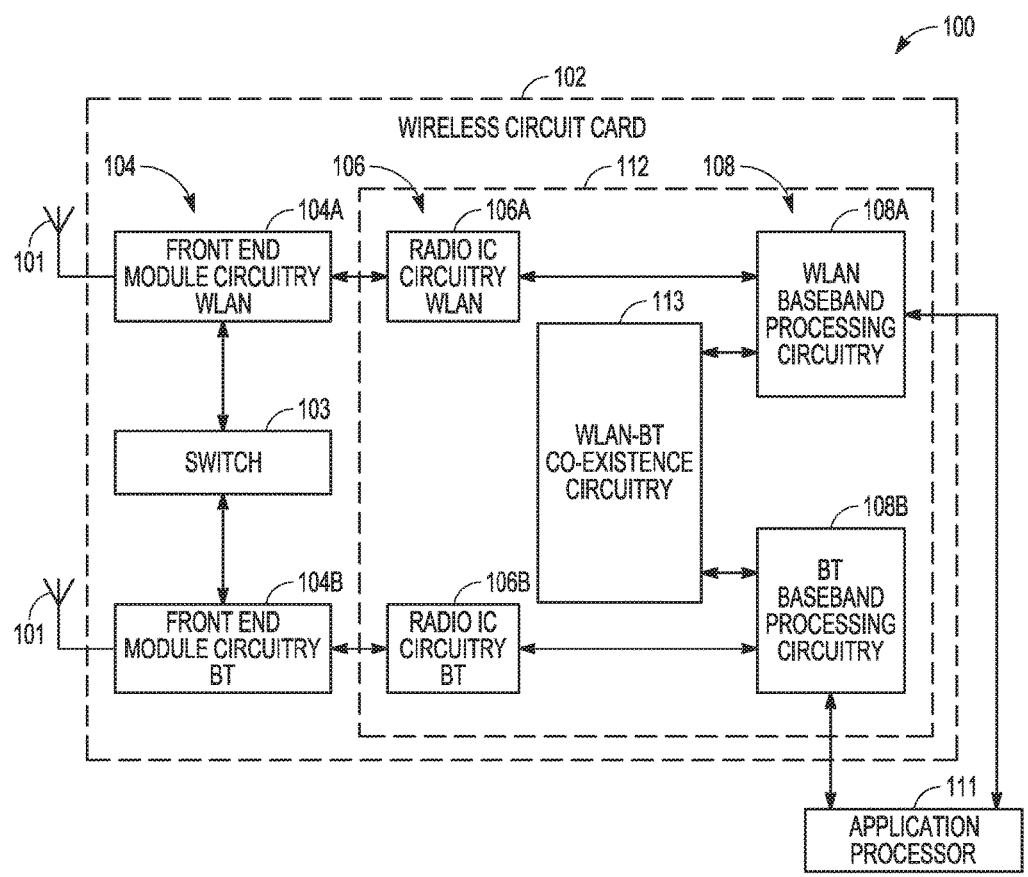
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 102, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
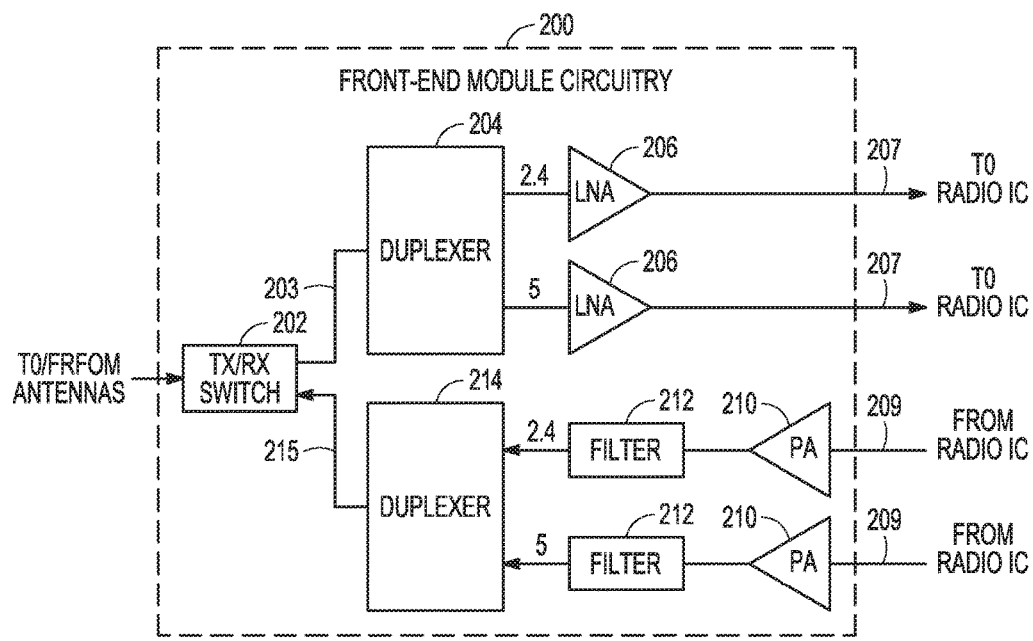
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
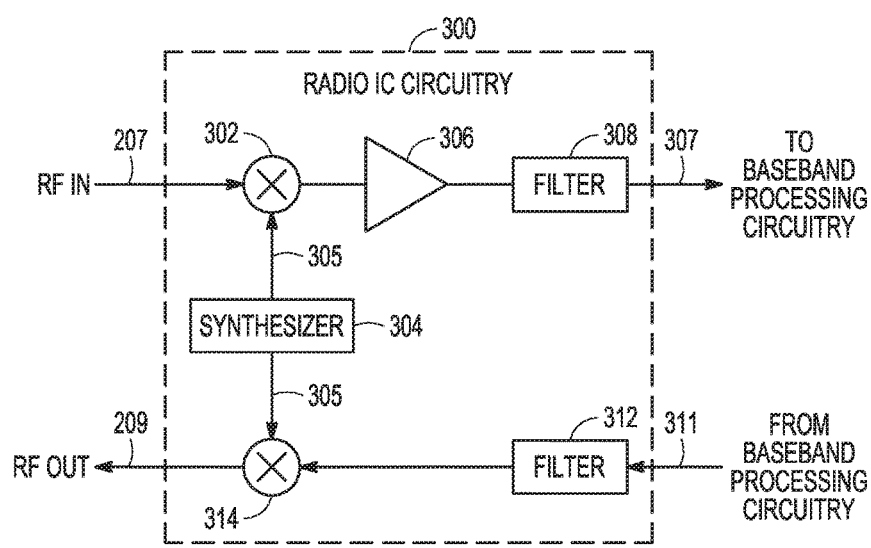
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
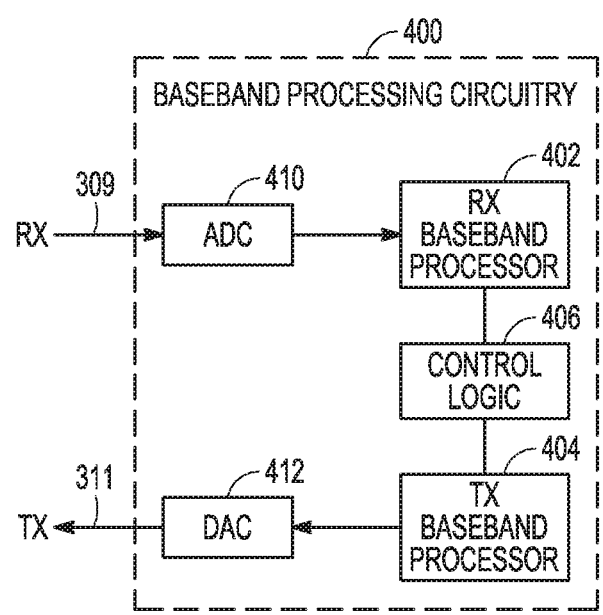
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
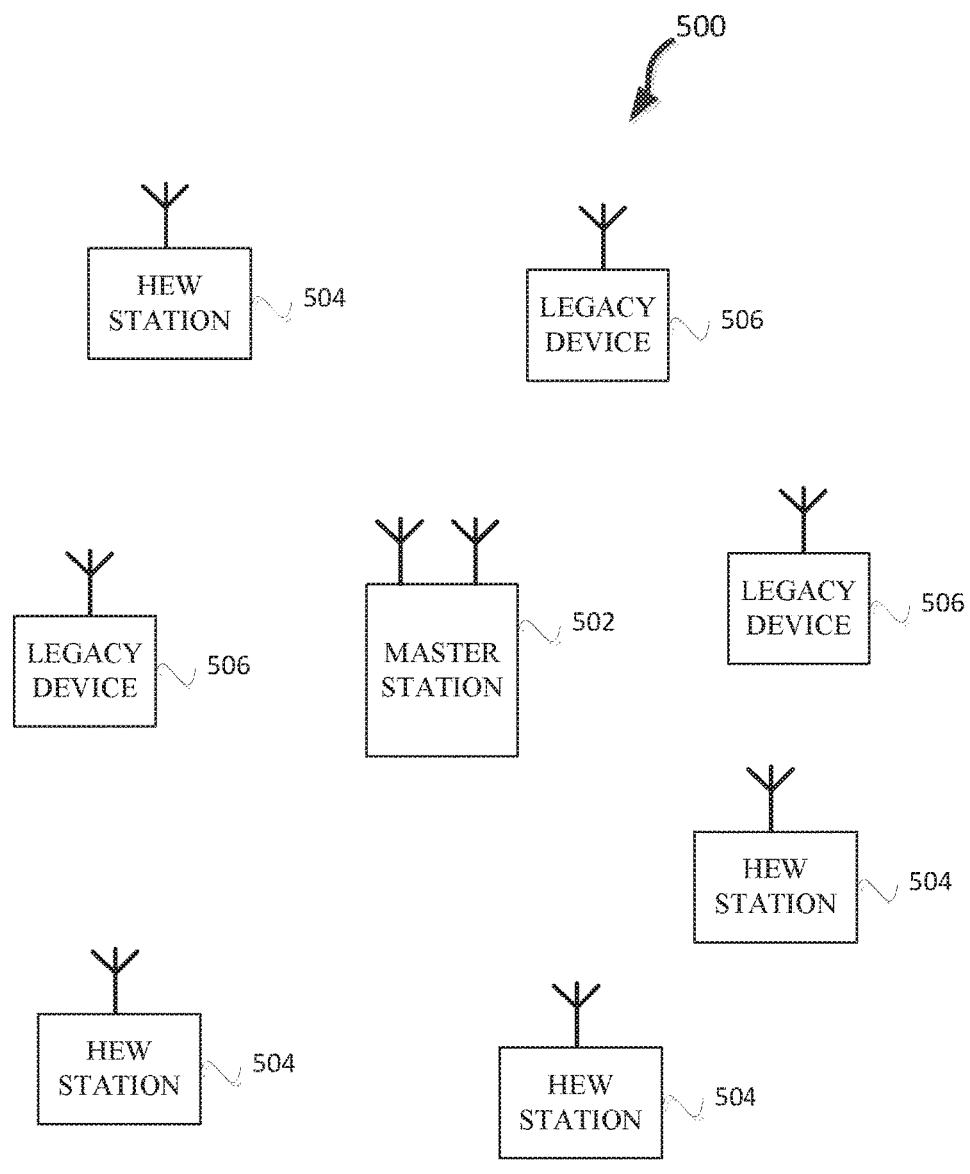
FIG. 5 illustrates a WLAN in accordance with some embodiments.

FIG. 5 illustrates a wireless local area network (WLAN) in accordance with some embodiments. The WLAN may comprise a basis service set (BSS) 500 that may include a master station 502, which may be an AP, a plurality of high-efficiency (HE) (e.g., IEEE 802.11ax) stations 504, and a plurality of legacy (e.g., IEEE 802.11n/ac) devices 506.

The master station 502 may be an AP using one of the IEEE 802.11 protocols to transmit and receive. The master station 502 may be a base station. The master station 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 502 and/or HE station 504 may use one or both of MU-MIMO and OFDMA. There may be more than one master station 502 that is part of an extended service set (ESS). A controller (not illustrated) may store information that is common to the more than one master station 502. The controller may have access to an external network such as the Internet.

The legacy devices 506 may operate in accordance with one or more of IEEE 802.11 a/b/g/n/ac/ad/af/ah/aj, or another legacy wireless communication standard. The legacy devices 506 may be STAs or IEEE 802.11 STAs. The HE stations 504 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 504, master station 502, and/or legacy devices 506 may be termed wireless devices. In some embodiments the HE station 504 may be a "group owner" (GO) for peer-to-peer modes of operation where the HE station 504 may perform some operations of a master station 502.

The master station 502 may communicate with legacy devices 506 in accordance with legacy IEEE 802.11 communication techniques. In example embodiments, the master station 502 may also be configured to communicate with HE stations 504 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 502, HE station 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 502 may operate as a master station which may be arranged to contend for a wireless medium (e.g., during a contention period) to receive exclusive control of the medium for an HE control period. In some embodiments, the HE control period may be termed a transmission opportunity (TXOP). The master station 502 may transmit a HE master-sync transmission, which may be a trigger frame or HE control and schedule transmission, at the beginning of the HE control period. The master station 502 may transmit a time duration of the TXOP and channel information. During the HE control period, HE stations 504 may communicate with the master station 502 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 502 may communicate with HE stations 504 using one or more HE frames. During the HE control period, the HE STAs 504 may operate on a channel smaller than the operating range of the master station 502. During the HE control period, legacy stations refrain from communicating.

In accordance with some embodiments, during the master-sync transmission, the HE STAs 504 may contend for the wireless medium with the legacy devices 506 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 504 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 504 and/or the master station 502 are configured to perform the methods and operations herein described in conjunction with FIGS. 5-8.

In an example, 11ax can enable better spatial reuse between neighboring BSSs in dense environments. In an example, a solution can be configured is to raise clear channel assessment (CCA) overlapping basic service set packet detection level (OBSS_PD) and reduce power by the same proportion. Such a configuration would not provide any changes with regards to the protection of an existing link, and such an example reuse mode can be allowed without any conditions on all received frames. In an example, the systems and methods disclosed herein can be scalable to even the densest environments. The STA(s) that implement systems and methods disclosed herein can have incentive to implement, because they can directly benefit. In an example, the systems and methods disclosed herein can be to certify in Wi-FI Alliance (WFA) and be fair to legacy applications. In an example, the systems and methods disclosed herein can have priority over a reuse solution with an interference level.

In an example, for the joint adaptation of OBSS_PD and Tx_Power, a specific proportional rule can be defined. Although embodiments herein are not limited to a particular rule, an example of such a rule is shown as follows:

OBSS_PD level must be less than or equal to the maximum of: (OBSSPD$_{min}$, min(OBSSPD$_{max}$, OBSSPD$_{min}$+(TXPWR$_{ref}$−TXPWR))), where TXPWR$_{ref}$=21 dBm for non-AP STAs or for AP STAs with 1 and 2 spatial streams and $TXPWR_{ref}=25$ dBm for AP STAs of 3 spatial streams or more.

In an example, the OBSS_PDlevel set forth above may be applicable to the start of a 20 MHz PPDU received on a primary 20 MHz channel. In an example, the OBSS_PDlevel at the start of a 40 MHz PPDU received on a primary 40 MHz channel may be OBSS_PDlevel+3 dB. In an example, the OBSS_PDlevel at the start of an 80 MHz PPDU received on a primary 80 MHz channel may be OBSS_PDlevel+6 dB.

Figure 6:
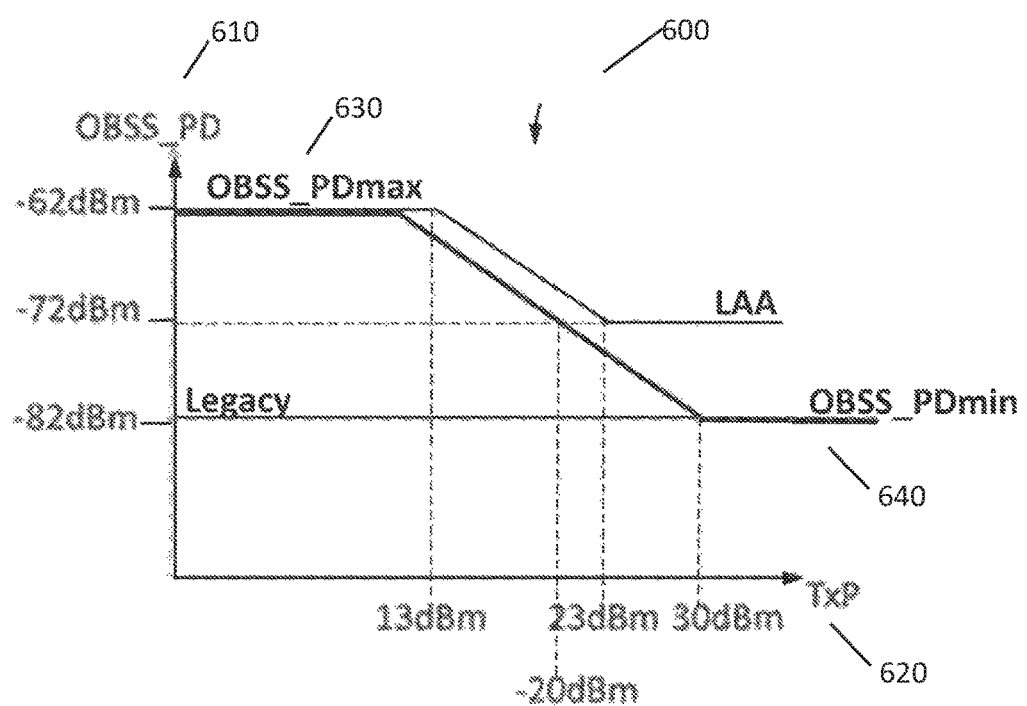
FIG. 6 illustrates a graphic representation of an example rule with increasing OBSS_PD on the y axis charted against increasing transmission power (TxP, TxPower) on the x axis, in accordance with some embodiments.

FIG. 6 illustrates a graphic representation 600 of the example rule described above with increasing OBSS_PD on the y axis 610 charted against increasing transmission power (TxP, TxPower) on the x axis 620. In an example, based on such a proportional rule, a STA can decide autonomously its operating point on the angled line extending from OBSS_PDmax 630 to OBSS_PDmin 640 (the STA can decide to reduce its TxPower to increase OBSS_PD).

In an example, the optimum proportional rule can be different depending on the environments (managed or unmanaged networks, dense or less dense). This rule can be adapted, by allowing some parameters in the equation to be tuned/defined by the AP. For instance, in a managed stadium deployment, a management entity can decide to tune the OBSS_PDmin/OBSS_PDmax and possibly a max TxPower to enable STAs to be more aggressive, as the parameters are tested and showing an improved performance.

In an example, a mechanism can be defined in order for an AP to qualify its environment as managed or unmanaged. If the AP is unmanaged, default parameters can be used for OBSS_PDmin and OBSS_PDmax. If the AP is managed, the AP can tune the parameters OBSS_PDmin and OBSS_PDmax within a predetermined range from default parameters. As disclosed herein, the STAs can use OBSS_Pdmin/max values as advertised by the AP.

In an example, a mechanism regarding the environment can include the following:

1) An AP can be allowed to qualify its environment as managed only if it didn't receive any beacons from OBSSs not belonging to the same management domain, since a predetermined ObservationTime, in its primary channel.

2) Otherwise the AP shall qualify its environment as unmanaged.

In an example, an environment can be either managed or unmanaged. Yet, because of soft APs that spread in all environments, and because in some venues, multiple managed networks overlap, this rule can result in qualifying all non-perfect managed environments as unmanaged, and can force using the default parameters.

In an example, parameters can be tuned in such non-perfect managed environments. APs belonging to a management domain can be allowed to define some parameters of the joint OBSS_PD/TxPower proportional rule for their BSS, especially the most sensitive ones like the OBSS_PD_min/max value, but only for the list of BSSs that belong to the same management domain. For example, such a configuration can mean that the AP and STAs from a BSS belonging to management domain 1 can use the spatial reuse proportional rule with specific parameters, but only when they perform spatial reuse over OBSS Physical Layer Convergence Protocol (PLCP) Protocol Data Units (PPDUs) belonging to OBSSs from the same management domain 1. In an example, this can provide that the AP and STAs from a BSS belonging to management domain 1 can use a spatial reuse proportional rule with the default parameters, when they perform spatial reuse over OBSS PPDUs belonging to OBSSs not part of the same management domain 1.

In an example, the specific parameters can be displayed by the APs from management domain 1, along with the list of all basic service set identifiers (BSSIDs) or BSS_colors that belong to management domain 1. In an example, the systems and methods disclosed herein can allow improving the flexibility of setting parameters for the spatial reuse with proportional rule, in non-perfect managed environments.

An example scenario can be a venue with a Cisco® managed deployment of many APs, all managed by a Cisco controller. In this venue, many Soft APs can overlap. All BSSs from Cisco APs can be assigned with a specific BSS color and are deployed in order to maximize performance/throughput. The controller can provide to each Cisco AP a set of parameters for the spatial reuse proportional rule (OBSS_PDmin/max, max power . . . ), and a list of BSSIDs/BSS_color on which these parameters can be used. These parameters can be optimized to ensure the best tradeoff between spatial reuse throughput gains and protection for weak users. In an example, there can be a single set of parameters for each BSS that apply to all other Cisco BSSs (all Cisco BSS colors).

In an alternative example, there can be configured for each BSS, a set of parameters that apply to each (or a group of) Cisco BSSs (one or multiple Cisco BSS colors). Cisco APs can display these parameters and the list of BSS_colors (BSSIDs) on which these parameters apply in beacons or other management frames. STAs associated with a Cisco AP and that implement spatial reuse with proportional rule receive these parameters and the list of BSS_colors. In an example, when receiving an OBSS PPDU from one Cisco BSS (with BSS_color in the list of Cisco BSS_colors), it can apply spatial reuse mode with the proportional rule and with parameters provided by their AP.

In an example, when receiving an OBSS PPDU from a non-Cisco BSS, like one of the soft-APs (with BSS_color not in the list of Cisco BSS_colors), it can apply spatial reuse mode with the proportional rule but only with the default parameters (that are defined in the specification and that are more protective).

Figure 7:
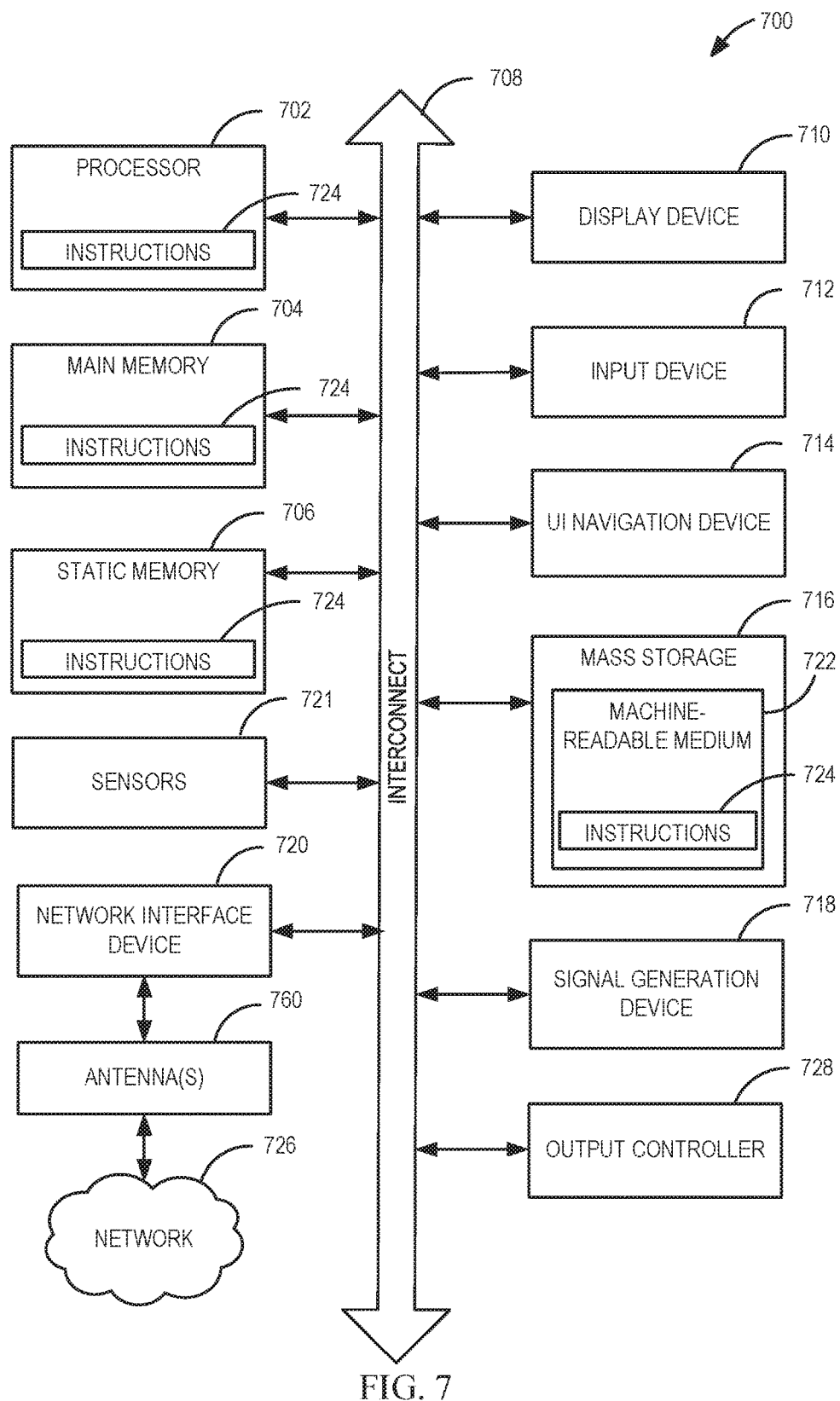
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. The machine 800 may incorporate all or some of the radio architecture illustrated in FIGS. 1-4. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a master station 502, HE station 504, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display device 710, an input device 712 (e.g., a keyboard), and a user interface (UI) navigation device 714 (e.g., a mouse). In an example, the display device 710, input device 712 and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 702 and/or instructions 724 may comprise processing circuitry and/or transceiver circuitry.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

An apparatus of the machine 700 may be one or more of a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 720 may include one or more physical jacks (e.g., Ethernet, coaxial, or phone jacks) or one or more antennas to connect to the communications network 726. In an example, the network interface device 720 may include one or more antennas 760 to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

Figure 8:
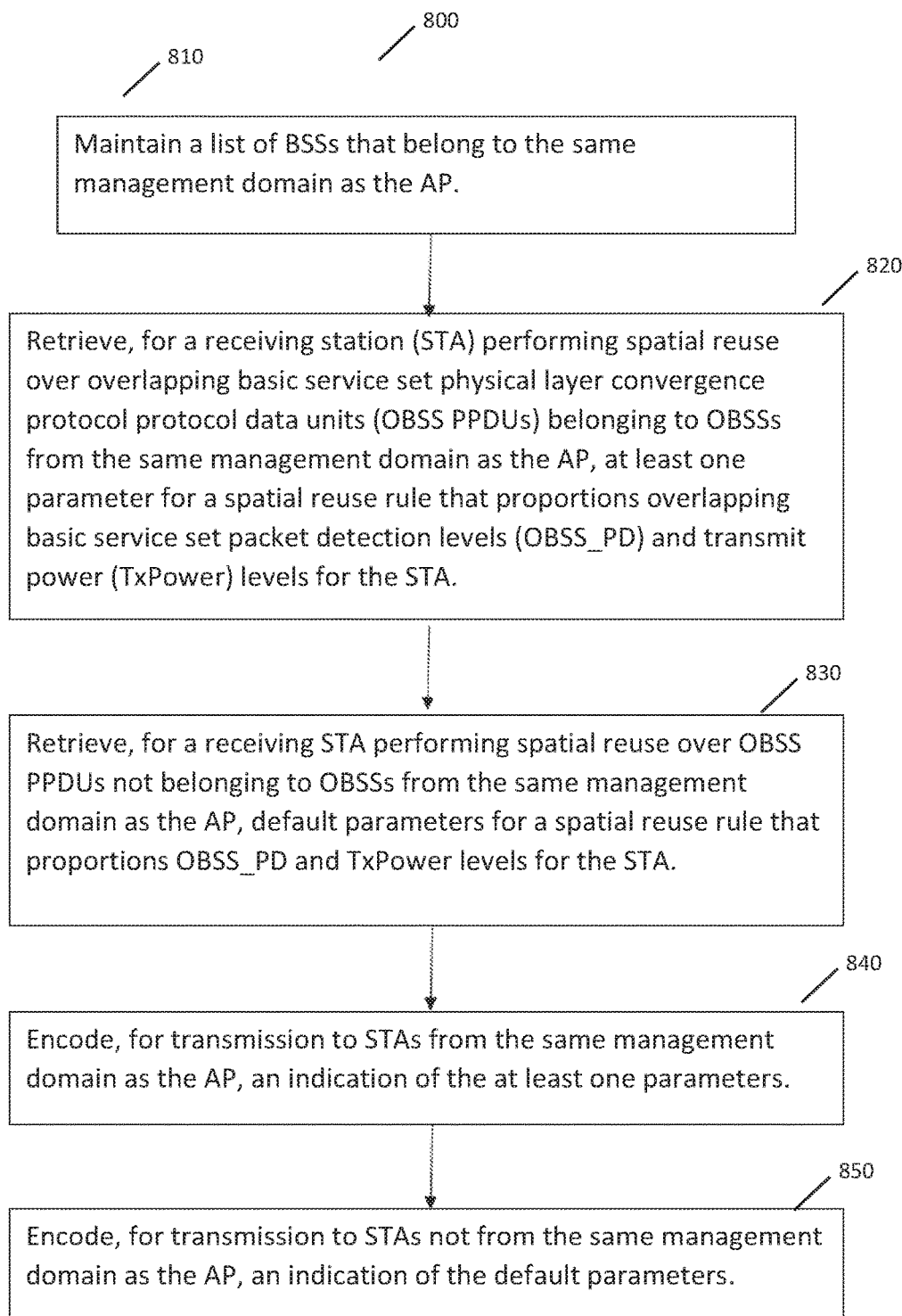
FIG. 8 illustrates a method in accordance with some embodiments.

FIG. 8, shown generally as 800, illustrates an example method according to some embodiments. At 810, the master station, which may be an AP 502, maintains a list of BSSs that belong to the same management domain as the AP 502. At 820, the AP 502 may retrieve, for a receiving station (STA) 504 performing spatial reuse over overlapping basic service set physical layer convergence protocol protocol data units (OBSS PPDUs) belonging to OBSSs from the same management domain as the AP 502, at least one parameter for a spatial reuse rule that proportions overlapping basic service set packet detection levels (OBSS_PD) and transmit power (TxPower) levels for the STA 504.

At 830, the AP 502 may retrieve, for a receiving STA performing spatial reuse over OBSS PPDUs not belonging to OBSSs from the same management domain as the AP 502, default parameters for a spatial reuse rule that proportions OBSS_PD and TxPower levels for the STA 504.

At 840, the AP 502 may encode, for transmission to STAs 502 from the same management domain as the AP 502, an indication of the at least one parameters.

At 850, the AP 502 may encode, for transmission to STAs 502 not from the same management domain as the AP 502, an indication of the default parameters.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media, optical storage media; flash memory, etc.

In Example 1, an apparatus for an access point (AP), configurable to operate in a basic service set (BSS) of a management domain may comprise memory. The apparatus may further comprise processing circuitry coupled to the memory. The processing circuitry may be configured to maintain a list of BSSs that belong to the management domain, retrieve, for a station (STA) configured to perform spatial reuse over overlapping basic service set (OBSS) physical layer convergence protocol (PLCP) protocol data units (OBSS PPDUs) belonging to OBSSs from the management domain, at least one parameter for a spatial reuse rule that proportions overlapping basic service set packet detection levels (OBSS_PD) and transmit power (TxPower) levels for the STA. In an embodiment the AP may retrieve, for a STA configured to perform spatial reuse over OBSS PPDUs not belonging to OBSSs from the management domain, default parameters for a spatial reuse rule that proportions OBSS_PD and TxPower levels for the STA and encode, for transmission to the STA belonging to the OBSSs from the management domain, an indication of the at least one parameters, and encode, for transmission to the STA not belonging to OBSSs from the management domain, an indication of the default parameters.

In Example 2, the subject matter of Example 1, wherein the processing circuitry may be further configured to encode the list of BSSs that belong to the management domain in beacons or other management frames for transmission to receiving STAs.

In Example 3, the subject matter of one or any combination of Examples 1-2, wherein the processing circuitry may be further configured to encode the at least one parameter for the spatial reuse rule in beacons or other management frames for transmission to receiving STAs.

In Example 4, the subject matter of one or any combination of Examples 1-3, the STA may perform spatial reuse over OBSS PPDUs belonging to OBSSs from the management domain and the at least one parameter for the spatial reuse rule that proportions OBSS_PD and TxPower levels for the STA may be an OBSS_PD_min value and an OBSS_PDmax value.

In Example 5, the subject matter of one or any combination of Examples 1-4, the spatial reuse rule may provide the allowable OBSS_PD level must be less than or equal to the maximum of (OBSSPD$_{min}$, min(OBSSPD$_{max}$, OBSSPD$_{min}$+ (TXPWR$_{ref}$−TXPWR))), and wherein TXPWR$_{ref}$=21 dBm for non-AP STAs or for AP STAs with 1 and 2 spatial streams and TXPWR$_{ref}$=25 dBm for AP STAs of 3 spatial streams or more.

In Example 6, the subject matter of one or any combination of Examples 1-5, further comprising transceiver circuitry coupled to the processing circuitry.

In Example 7, the subject matter of one or any combination of Examples 1-6, further comprising one or more antennas coupled to the transceiver circuitry.

In Example 8, a non-transitory computer-readable storage medium that stores instructions for execution by one or more processors to configure a wireless device to operate as an access point (AP) in a basic service set (BSS) of a management domain, the instructions to further configure the AP to maintain a list of BSSs that belong to the management domain and define, for a receiving station (STA) performing spatial reuse over overlapping basic service set physical layer convergence protocol protocol data units (OBSS PPDUs) belonging to OBSSs from the management domain, at least one parameter for a spatial reuse rule that proportions overlapping basic service set packet detection levels (OBSS_PD) and transmit power (TxPower) levels for the STA. The non-transitory computer-readable storage medium that stores instructions for execution by one or more processors to configure a wireless device to operate as an access point (AP) in a basic service set (BSS) of a management domain may further configure the AP to define, for a receiving STA performing spatial reuse over OBSS PPDUs not belonging to OBSSs from the management domain, default parameters for a spatial reuse rule that proportions OBSS_PD and TxPower levels for the STA and encode, for transmission to STAs from the management domain, an indication of the at least one parameters; and encode, for transmission to STAs not from the management domain, an indication of the default parameters.

In Example 9, the subject matter of Example 8, the STA performing spatial reuse may be over OBSS PPDUs belonging to OBSSs from the management domain, the at least one parameter for the spatial reuse rule that proportions OBSS_PD and TxPower levels for the STA may be an OBSS_PD_min value and an OBSS_PDmax value.

In Example 10, the subject matter of one or any combination of Examples 8-9, wherein the spatial reuse rule provides the allowable OBSS_PD level must be less than or equal to max(OBSSPD$_{min}$, min(OBSSPD$_{max}$, OBSSPD$_{min}$+ (TXPWR$_{ref}$−TXPWR))), and wherein TXPWR$_{ref}$=21 dBm for non-AP STAs or for AP STAs with 1 and 2 spatial streams and TXPWR$_{ref}$=25 dBm for AP STAs of 3 spatial streams or more.

In Example 11, the subject matter of one or any combination of Examples 8-10, the instructions to cause the one or more processors to further configure the AP to encode the list of BSSs that belong to the management domain in beacons or other management frames for transmission to receiving STAs.

In Example 12, the subject matter of one or any combination of Examples 8-11, the instructions to cause the one or more processors to further configure the AP to encode the at least one parameter for the spatial reuse rule in beacons or other management frames for transmission to receiving STAs.

In Example 13, a method performed by an access point (AP), configurable to operate in a basic service set (BSS) of a management domain, the method comprising maintaining a list of BSSs that belong to the management domain and defining, for a receiving station (STA) performing spatial reuse over overlapping basic service set physical layer convergence protocol protocol data units (OBSS PPDUs) belonging to OBSSs from the management domain, at least one parameter for a spatial reuse rule that proportions overlapping basic service set packet detection levels (OBSS_PD) and transmit power (TxPower) levels for the STA. The method may continue by defining, for a receiving STA performing spatial reuse over OBSS PPDUs not belonging to OBSSs from the management domain, default parameters for a spatial reuse rule that proportions OBSS_PD and TxPower levels for the STA. The method may continue by encoding, for transmission to STAs from the management domain, an indication of the at least one parameters and encoding, for transmission to STAs not from the management domain, an indication of the default parameters.

In Example 14, the subject matter Example 13, further comprising encoding the list of BSSs that belong to the management domain in beacons or other management frames for transmission to STAs.

In Example 15, the subject matter of one or any combination of Examples 13-14, further comprising encoding the at least one parameter for the spatial reuse rule in beacons or other management frames for transmission to STAs.

In Example 16, the subject matter of one or any combination of Examples 13-15, further comprising requiring the allowable OBSS_PD level to be less than or equal to the maximum of (OBSSPD$_{min}$, min(OBSSPD$_{max}$, OBSSPD$_{min}$+(TXPWR$_{ref}$−TXPWR))), wherein TXPWR$_{ref}$=21 dBm for non-AP STAs or for AP STAs with 1 and 2 spatial streams and TXPWR$_{ref}$=25 dBm for AP STAs of 3 spatial streams or more.

In Example 17, an apparatus for a station (STA), configurable to operate in a basic service set (BSS) with an associated access point (AP) of a management domain, the apparatus comprising memory and processing circuitry configured to decode received overlapping basic service set physical layer convergence protocol protocol data units (OBSS PPDUs), determine if the OBSS PPDUs are from a BSS in the same management domain, apply a spatial reuse rule with at least one parameter received from the AP that proportions overlapping basic service set packet detection (OBSS_PD) levels and transmit power (TxPower) levels for the STA if the OBSS PPDUs are from the management domain. The apparatus may further apply a spatial reuse rule with default parameters received from the AP that proportions OBSS_PD levels and TxPower levels for the STA if the OBSS PPDUs are not from the management domain and may adjust the proportion of OBSS_PD levels and TxPower levels according to the spatial reuse rule for spatial reuse operation.

In Example 18, the subject of Example 17, wherein the spatial reuse rule provides the allowable OBSS_PD level must be less than or equal to the maximum of (OBSSPD$_{min}$, min(OBSSPD$_{max}$, OBSSPD$_{min}$+(TXPWR$_{ref}$−TXPWR))), and wherein TXPWR$_{ref}$=21 dBm for non-AP STAs or for AP STAs with 1 and 2 spatial streams and TXPWR$_{ref}$=25 dBm for AP STAs of 3 spatial streams or more.

In Example 19, the subject matter of one or any combination of Examples 17-18, wherein the OBSS_PD$_{level}$ is applicable to the start of a 20 MHz PPDU received on a primary 20 MHz channel.

In Example 20, the subject matter of one or any combination of Examples 17-19, wherein the OBSS_PD$_{level}$ at the start of a 40 MHz PPDU received on a primary 40 MHz channel is OBSS_PD$_{level}$+3 dB.

In Example 21, the subject matter of one or any combination of Examples 17-20, wherein the OBSS_PD$_{level}$ at the start of an 80 MHz PPDU received on a primary 80 MHz channel is OBSS_PD$_{level}$+6 dB.

In Example 22, the subject matter of one or any combination of Examples 17-21, further comprising transceiver circuitry coupled to the processing circuitry.

In Example 23, the subject matter of one or any combination of Examples 17-22, further comprising one or more antennas coupled to the transceiver circuitry.

What is claimed is:

1. An apparatus for an access point (AP), configurable to operate in a basic service set (BSS) of a management domain, the apparatus comprising memory and processing circuitry coupled to the circuitry configured to:
   maintain a list of BSSs that belong to the management domain;
   retrieve, for a station (STA) configured to perform spatial reuse over overlapping basic service set (OBSS) physical layer convergence protocol (PLCP) protocol data units (OBSS PPDUs) belonging to OBSSs from the management domain, at least one parameter for a spatial reuse rule that proportions overlapping basic service set packet detection levels (OBSS_PD) and transmit power (TxPower) levels for the STA;
   retrieve, for a STA configured to perform spatial reuse over OBSS PPDUs not belonging to OBSSs from the management domain, default parameters for a spatial reuse rule that proportions OBSS_PD and TxPower levels for the STA;
   encode, for transmission to the STA belonging to the OBSSs from the management domain, an indication of the at least one parameters; and
   encode, for transmission to the STA not belonging to OBSSs from the management domain, an indication of the default parameters.

2. The apparatus of claim 1, wherein the processing circuitry is further configured to encode the list of BSSs that belong to the management domain in beacons or other management frames for transmission to receiving STAs.

3. The apparatus of claim 2, wherein the processing circuitry is further configured to encode the at least one parameter for the spatial reuse rule in beacons or other management frames for transmission to receiving STAs.

4. The apparatus of claim 2, wherein the spatial reuse rule provides the allowable OBSS_PD level must be less than or equal to the maximum of (OBSSPD$_{min}$, min(OBSSPD$_{max}$, OBSSPD$_{min}$+(TXPWR$_{ref}$−TXPWR))), and
   wherein TXPWR$_{ref}$=21 dBm for non-AP STAs or for AP STAs with 1 and 2 spatial streams and TXPWR$_{ref}$=25 dBm for AP STAs of 3 spatial streams or more.

5. The apparatus of claim 4, further comprising one or more antennas coupled to the transceiver circuitry.

6. The apparatus of claim 1, wherein for the STA performing spatial reuse over OBSS PPDUs belonging to OBSSs from the management domain, the at least one parameter for the spatial reuse rule that proportions OBSS_PD and TxPower levels for the STA is an OBSS_PD_min value and an OBSS_PDmax value.

7. The apparatus of claim 1, further comprising transceiver circuitry coupled to the processing circuitry.

8. A non-transitory computer-readable storage medium that stores instructions for execution by one or more processors to configure a wireless device to operate as an access point (AP) in a basic service set (BSS) of a management domain, the instructions to further configure the AP to:
   maintain a list of BSSs that belong to the management domain;
   retrieve, for a receiving station (STA) performing spatial reuse over overlapping basic service set physical layer convergence protocol protocol data units (OBSS PPDUs) belonging to OBSSs from the management domain, at least one parameter for a spatial reuse rule that proportions overlapping basic service set packet detection levels (OBSS_PD) and transmit power (Tx-Power) levels for the STA;
   retrieve, for a receiving STA performing spatial reuse over OBSS PPDUs not belonging to OBSSs from the management domain, default parameters for a spatial reuse rule that proportions OBSS_PD and TxPower levels for the STA;
   encode, for transmission to the STA from the management domain, an indication of the at least one parameters; and
   encode, for transmission to the STA not from the management domain, an indication of the default parameters.

9. The non-transitory computer-readable storage medium of claim 8, wherein for the STA performing spatial reuse over OBSS PPDUs belonging to OBSSs from the management domain, the at least one parameter for the spatial reuse rule that proportions OBSS_PD and TxPower levels for the STA is an OBSS_PD_min value and an OBSS_PDmax value.

10. The non-transitory computer-readable storage medium of claim 8, wherein the spatial reuse rule provides the allowable OBSS_PD level must be less than or equal to max($OBSSPD_{min}$, min($OBSSPD_{max}$, $OBSSPD_{min}$+($TXPWR_{ref}$-TXPWR))), and
   wherein $TXPWR_{ref}$=21 dBm for non-AP STAs or for AP STAs with 1 and 2 spatial streams and $TXPWR_{ref}$=25 dBm for AP STAs of 3 spatial streams or more.

11. The non-transitory computer-readable storage medium of claim 8, the instructions to cause the one or more processors to further configure the AP to encode the list of BSSs that belong to the management domain in beacons or other management frames for transmission to receiving STAs.

12. The non-transitory computer-readable storage medium of claim 11, the instructions to cause the one or more processors to further configure the AP to encode the at least one parameter for the spatial reuse rule in beacons or other management frames for transmission to receiving STAs.

13. A method performed by an access point (AP), configurable to operate in a basic service set (BSS) of a management domain, the method comprising:
   maintaining a list of BSSs that belong to a management domain;
   retrieving, for a receiving station (STA) performing spatial reuse over overlapping basic service set physical layer convergence protocol protocol data units (OBSS PPDUs) belonging to OBSSs from the management domain, at least one parameter for a spatial reuse rule that proportions overlapping basic service set packet detection levels (OBSS_PD) and transmit power (Tx-Power) levels for the STA;
   retrieving, for a receiving STA performing spatial reuse over OBSS PPDUs not belonging to OBSSs from the management domain, default parameters for a spatial reuse rule that proportions OBSS_PD and TxPower levels for the STA;
   encoding, for transmission to the STA from the management domain, an indication of the at least one parameters; and
   encoding, for transmission to the STA not from the management domain, an indication of the default parameters.

14. The method of claim 13, further comprising encoding the list of BSSs that belong to the management domain in beacons or other management frames for transmission to STAs.

15. The method of claim 14, further comprising encoding the at least one parameter for the spatial reuse rule in beacons or other management frames for transmission to STAs.

16. The method of claim 13, further comprising requiring the allowable OBSS_PD level to be less than or equal to the maximum of ($OBSSPD_{min}$, min($OBSSPD_{max}$, $OBSSPD_{min}$+($TXPWR_{ref}$-TXPWR))), wherein $TXPWR_{ref}$=21 dBm for non-AP STAs or for AP STAs with 1 and 2 spatial streams and $TXPWR_{ref}$=25 dBm for AP STAs of 3 spatial streams or more.

17. An apparatus for a station (STA), configurable to operate in a basic service set (BSS) with an associated access point (AP) of a management domain, the apparatus comprising memory and processing circuitry configured to:
   decode received overlapping basic service set (OBSS) physical layer convergence protocol (PLCP) protocol data units (OBSS PPDUs);
   determine if the OBSS PPDUs are from a BSS in a same management domain;
   apply a spatial reuse rule with at least one parameter received from the AP that proportions overlapping basic service set packet detection (OBSS_PD) levels and transmit power (TxPower) levels for the STA if the OBSS PPDUs are from the management domain;
   apply a spatial reuse rule with default parameters received from the AP that proportions OBSS_PD levels and TxPower levels for the STA if the OBSS PPDUs are not from the management domain; and
   adjust the proportion of OBSS_PD levels and TxPower levels according to the spatial reuse rule for spatial reuse operation.

18. The apparatus of claim 17, wherein the spatial reuse rule provides the allowable OBSS_PD level must be less than or equal to the maximum of ($OBSSPD_{min}$, min($OBSSPD_{max}$, $OBSSPD_{min}$+($TXPWR_{ref}$-TXPWR))), and
   wherein $TXPWR_{ref}$=21 dBm for non-AP STAs or for AP STAs with 1 and 2 spatial streams and $TXPWR_{ref}$=25 dBm for AP STAs of 3 spatial streams or more.

19. The apparatus of claim 18, wherein the $OBSS\_PD_{level}$ is applicable to the start of a 20 MHz PPDU received on a primary 20 MHz channel.

20. The apparatus of claim 18, wherein the $OBSS\_PD_{level}$ at the start of a 40 MHz PPDU received on a primary 40 MHz channel is $OBSS\_PD_{level}+3$ dB.

21. The apparatus of claim 18, wherein the $OBSS\_PD_{level}$ at the start of an 80 MHz PPDU received on a primary 80 MHz channel is $OBSS\_PD_{level}+6$ dB.

22. The apparatus of claim 17, further comprising transceiver circuitry coupled to the processing circuitry.

23. The apparatus of claim 17, further comprising one or more antennas coupled to the transceiver circuitry.

\* \* \* \* \*

UNITED STATES PATENT AND TRADEMARK OFFICE
CERTIFICATE OF CORRECTION

PATENT NO. : 10,039,115 B2  
APPLICATION NO. : 15/386925  
DATED : July 31, 2018  
INVENTOR(S) : Cariou et al.

Page 1 of 1

It is certified that error appears in the above-identified patent and that said Letters Patent is hereby corrected as shown below:

In the Claims

Column 19, Line 21, in Claim 8, after "convergence protocol", insert --(PLCP)--

Column 20, Line 5, in Claim 13, after "convergence protocol", insert --(PLCP)--

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*